(12) United States Patent
Roose et al.

(10) Patent No.: US 9,597,653 B2
(45) Date of Patent: Mar. 21, 2017

(54) PROCESS FOR THE PREPARATION OF COLLOIDAL POLYMERIZED PARTICLES

(71) Applicant: Allnex Belgium S.A., Brussels (BE)

(72) Inventors: Patrice Roose, Sint-Pieters-Leeuw (BE); Michel Tielemans, Wemmel (BE); Jean-Yves Salviato, Les Bons Villers (BE); Jean-Noel Baurant, Dilbeek (BE); Francis Bergiers, La Hulpe (BE); Stephan Peeters, Heverlee (BE)

(73) Assignee: ALLNEX BELGIUM S.A., Brussels (BE)

( * ) Notice: Subject to any disclaimer, the term of this patent is extended or adjusted under 35 U.S.C. 154(b) by 10 days.

(21) Appl. No.: 14/437,651

(22) PCT Filed: Nov. 19, 2013

(86) PCT No.: PCT/EP2013/074163
§ 371 (c)(1),
(2) Date: Apr. 22, 2015

(87) PCT Pub. No.: WO2014/079838
PCT Pub. Date: May 30, 2014

(65) Prior Publication Data
US 2015/0290610 A1    Oct. 15, 2015

(30) Foreign Application Priority Data

Nov. 21, 2012 (EP) .................... 12193579

(51) Int. Cl.
| | | |
|---|---|---|
| *B01J 13/00* | (2006.01) | |
| *C08F 283/00* | (2006.01) | |
| *C08J 3/28* | (2006.01) | |
| *C08F 2/50* | (2006.01) | |
| *C04B 24/28* | (2006.01) | |
| *C04B 24/26* | (2006.01) | |
| *C04B 24/32* | (2006.01) | |
| *C08F 2/48* | (2006.01) | |

(52) U.S. Cl.
CPC .......... *B01J 13/00* (2013.01); *B01J 13/0021* (2013.01); *B01J 13/0039* (2013.01); *C04B 24/2641* (2013.01); *C04B 24/281* (2013.01); *C04B 24/282* (2013.01); *C04B 24/283* (2013.01); *C04B 24/286* (2013.01); *C04B 24/32* (2013.01); *C08F 2/50* (2013.01); *C08F 283/006* (2013.01); *C08F 283/008* (2013.01); *C08J 3/28* (2013.01); *C08F 2/48* (2013.01); *C08J 2351/08* (2013.01); *C08J 2375/16* (2013.01)

(58) Field of Classification Search
CPC .... B01J 13/00; B01J 13/0021; B01J 13/0039; C08J 3/28; C08J 2351/08; C08J 2375/16; C08F 283/008; C08F 283/006; C08F 2/50; C08F 2/48; C04B 24/286; C04B 24/2641; C04B 24/283; C04B 24/281; C04B 24/32; C04B 24/282
See application file for complete search history.

(56) References Cited

U.S. PATENT DOCUMENTS

| | | |
|---|---|---|
| 4,588,639 A | 5/1986 | Ozono |
| 4,806,450 A | 2/1989 | Hofmann et al. |
| 5,548,005 A | 8/1996 | Kurth et al. |
| 6,808,865 B1 | 10/2004 | Morigaki et al. |
| 7,226,957 B1 | 6/2007 | Scranton et al. |
| 7,605,209 B2 | 10/2009 | Killilea et al. |
| 2004/0254293 A1 | 12/2004 | Killilea et al. |
| 2006/0148975 A1 | 7/2006 | Rink et al. |
| 2007/0105971 A1 | 5/2007 | Schaller et al. |
| 2008/0146448 A1 | 6/2008 | Dyllick-Brenzinger et al. |
| 2009/0053272 A1* | 2/2009 | Wagenblast ............ C08F 2/18 424/401 |
| 2013/0122310 A1 | 5/2013 | Tielemans et al. |

FOREIGN PATENT DOCUMENTS

| | | |
|---|---|---|
| CN | 101628218 | 1/2010 |
| CN | 102029133 | 4/2011 |
| CN | 102702421 | 10/2012 |
| EP | 0 134 300 | 3/1985 |
| EP | 2 412 739 | 2/2012 |
| JP | 2004-91729 | 3/2004 |
| JP | 2004-091729 | 3/2004 |
| WO | 03/046095 | 6/2003 |
| WO | 03/093378 | 11/2003 |
| WO | 2006/094526 | 9/2006 |
| WO | 2007/104750 | 9/2007 |
| WO | 2007/118782 | 10/2007 |
| WO | 2009/115489 | 9/2009 |
| WO | 2010/003924 | 1/2010 |
| WO | 2010/042943 | 4/2010 |
| WO | 2010/121387 | 10/2010 |
| WO | 2012/013488 | 2/2012 |

OTHER PUBLICATIONS

International Search Report issued Feb. 11, 2014 in International (PCT) Application No. PCT/EP2013/074163.
P. Roose et al., "UV-Nanoparticles: Photopolymerized Polymer Colloids from Aqueous Dispersions of Acrylated Oligomers", Progress in Organic Coatings, vol. 77, pp. 1569-1576, 2014.

* cited by examiner

*Primary Examiner* — Nicole M Buie-Hatcher
(74) *Attorney, Agent, or Firm* — Wenderoth, Lind & Ponack, L.L.P.

(57) ABSTRACT

The present invention relates to a process for the preparation of dispersions of colloidal polymerized particles and to the colloidal polymerized particles obtained and/or obtainable by the process as well as to their use.

12 Claims, No Drawings

PROCESS FOR THE PREPARATION OF COLLOIDAL POLYMERIZED PARTICLES

The present invention relates to a process for the preparation of dispersions of colloidal polymerized particles and to the colloidal polymerized particles obtained and/or obtainable by the process as well as to their use.

Aqueous dispersions of polymerized particles are often synthesized by emulsion polymerization that has been widely described in the prior art. In this case, the polymerization is usually thermally initiated or, more exceptionally, photoinitiated or photoinduced. Thermal polymerization typically employs a water-soluble radical initiator like potassium persulfate or a water-soluble redox initiator system like t-butylhydroperoxide in combination with sodium formaldehyde sulfoxylate. Oil-soluble thermally activated radical initiators such as 2,2'-azobis(isobutyronitrile) are typically used in the case of suspension polymerization. In any case, the polymerization process usually requires reaction times of the order of hours at elevated temperature, especially in the usual case of semi-continuous process where the pre-emulsion of monomer is added incrementally to the reactor in order to control the polymerization exothermicity. In contrast, photoinduced polymerization can generally be conducted at room temperature or even below and is advantageous in the case of post-polymerization or post-crosslinking of polymer particles. However, the use of photoinduced polymerization to prepare colloidal polymerized or crosslinked particles is not widespread and scarcely described. Furthermore, the known prior art documents refer to the use of emulsifiers or other dispersing aids to stabilize the monomer emulsion and the polymer dispersion during the emulsion polymerization process.

US 2007/0105971 describes a method for the cross-linking with ultraviolet (UV) or visible light of a rubber latex in the presence of a starter to form an elastomer by photoinduced polymerization. The composition comprises an emulsifying or dispersing agent. No particle size is mentioned in the document.

WO 2010/121387 describes the preparation of polymer nanoparticles by photoinduced emulsion polymerization using a phosphine oxide derivative as water soluble photoinitiator. The process requires the presence of at least one surfactant to stabilize the emulsion.

EP 0134300 describes a method to prepare microcapsules having a cured wall and an uncured core. A composition comprising hydrophobic (meth)acrylate monomers and/or oligomers, a sensitizer and a UV-screening agent is dispersed in water and cured by UV-illumination. The water contains a high molecular weight compound used to emulsify the system, which prevents flocculation. The size of the obtained microcapsules ranges from 50 and 300 µm. The examples merely illustrate the invention for suspensions of very low solid content (2 weight percent (wt %)).

In WO 2010/042943, a prepolymer mixture is exposed to a light source passing through a mask having a particular shape to produce hydrogel particles that have the particular shape. The prepolymer composition is not a colloidal dispersion.

U.S. Pat. No. 7,226,957 describes a method for producing polymers with controlled molecular weight and desired end functionalities based on the controlled illumination of a microemulsion. By definition, a microemulsion contains monomers and high amounts of surfactant to achieve the ultrafine scale of the particles leading to optically transparent liquids.

Recently, the route of photoinduced miniemulsion polymerization of acrylate monomers has been explored by Chemtob et al. [Colloid. Polym. Sci., 2010; 288, 579-587 and Marcomolecules, 2011, 44, 8727-8737]. Here, the use of surfactant is again an important requirement to prepare the monomer miniemulsions successfully. In addition, a hydrophobic costabilizer is needed for the preparation of the miniemulsion. Light scattering is reported as being critical during photopolymerization and forces the size and the number of particles to low values for successful polymerizations.

Falk et al. [Chem. Mater., 2004, 16, 5033-5041] presented the synthesis of epoxy-functional microspheres using cationic ring-opening suspension photopolymerization in both aqueous and non-aqueous media. The size range of the exemplified microspheres was 5 to 200 µm. The reactions are always described for translucent liquids at low concentration (less than 5 wt %) in the presence of a polymeric dispersing aid.

Xiao et al. [Polymer, 2007, 48, 4765-4776] describe a method for producing epoxy resin-containing microcapsules via UV-initiated radical polymerization in an epoxy emulsion. Epoxyacrylates and a polymerizable emulsifier were used as the wall-formers which accumulate at the exterior of the droplets during the emulsification process. Upon UV-exposure, the outer shell solidifies and forms the final encapsulant containing liquid epoxy resin. Microcapsules size ranging from 5 to 35 µm are reported.

Against this background, we now provide a process for the preparation of colloidal polymerized particles (CPP) comprising the steps of:
  (a) forming a photopolymerizable aqueous colloidal dispersion (ACD) comprising:
    (i) at least one self-water dispersible compound (SW),
    (ii) at least one photoinitiator (PI),
    (iii) optionally at least one photopolymerizable compound (B),
  (b) polymerizing the photopolymerizable aqueous colloidal dispersion (ACD) by photoinduced polymerization to form a dispersion of colloidal polymerized particles (DCPP),
  (c) optionally isolating the particles obtained at step (b) from the aqueous phase to obtain isolated colloidal polymerized particles (ICPP).

Words importing the singular number also include the plural and vice versa.

The term "aqueous colloidal dispersion" (ACD) as used herein designates a heterogeneous system comprising at least an aqueous continuous phase and at least a dispersed phase wherein the particles or droplets of the dispersed phase have at least in one direction a dimension ranging from 1 to 999 nm.

The term "dispersion of colloidal polymerized particles" (DCPP) as used herein designates a heterogeneous system comprising at least an aqueous continuous phase and at least a dispersed phase wherein the polymerized particles have at least in one direction a dimension ranging from 1 to 999 nm.

The term "colloidal polymerized particles" (CPP) as used herein designate polymerized particles that have at least in one direction a dimension ranging from 1 to 999 nm.

By "polymerized particles" is meant polymerized or crosslinked particles wherein at least part of the photopolymerizable carbon-carbon double bonds of the photopolymerizable compounds have polymerized. Preferred polymerized particles are crosslinked, i.e. the level of polymerization is such that a three dimensional network is formed.

By "photopolymerizable compound" is meant any compound comprising at least one photopolymerizable carbon-carbon double bond. The photopolymerizable carbon-carbon double bonds are generally selected from vinyl, allylic or (meth)acrylic double bonds. Preferred are compounds that have (meth)acrylic double bond(s). (Meth)acrylated compounds as used in the present invention are compounds comprising at least one acrylic double bond (CH2=CHCOO—) and/or methacrylic double bond (CH2=CCH3COO—), as well as mixtures of such compounds.

The process according to the present invention comprises a step of forming a photopolymerizable aqueous colloidal dispersion (ACD).

The dispersion (ACD) is generally formed by dispersion of compound (SW) in water. The dispersion can be obtained by adding compound (SW) into water or conversely by adding water to compound (SW). Compound (SW) is preferably added into water. Usually this dispersion proceeds under high speed mixing (500 to 2000 rpm). The temperature of compound (SW) during dispersion is typically ranging from 5 to 110° C., preferably from 10 to 90° C. Devices known by the skilled person are used to perform the dispersion, such as high speed dispersers commercialized under the names Cowles or Dispermat equipped with sawtooth blades. Other tools known as Ultra Turrax high shear homogenizers can also be used for this purpose.

The photopolymerizable aqueous colloidal dispersion (ACD) according to the process of the present invention comprises:
(a) from 35 to 99.5 wt % of aqueous phase calculated on the total weight of the dispersion (ACD),
(b) from 0.5 to 65 wt % of dry content calculated on the total weight of the dispersion (ACD),
wherein the dry content comprises:
   (i) from 26 to 99.9 wt % of compound (SW),
   (ii) from 0.1 to 14 wt % of photoinitiator (PI),
   (iii) from 0 to 60 wt % of compound (B),
   the amounts of compound (SW), photoinitiator (PI) and compound (B) are calculated based on the dry content of the dispersion (ACD).

The dry content of the dispersion (ACD) is determined gravimetrically after drying the sample for 2 hours at 110° C. in a ventilated oven.

Relative to the total weight of the dispersion (ACD), the amount of aqueous phase is preferably at least 40 wt %, more preferably at least 50 wt %. The aqueous phase comprises water and preferably does not comprise any organic solvent. It may however also contain up to 40 wt %, preferably not more than 20 wt % of organic solvents miscible to water such as acetone, methylethylketone, ethanol, isopropanol, N-methylpyrrolidone, N-ethylpyrrolidone.

Relative to the total weight of the dispersion (ACD), the amount of dry content is preferably at most 60 wt %, more preferably at most 50 wt %.

Relative to the dry content of the dispersion (ACD), the amount of compound (SW) is preferably at least 40 wt %, more preferably at least 50 wt %.

Relative to the dry content of the dispersion (ACD), the amount of photoinitiator (PI) is preferably at least 0.5 wt %, more preferably at least 2 wt %. The amount of photoinitiator (PI) is preferably at most 8 wt %, more preferably at most 5 wt %.

Relative to the dry content of the dispersion (ACD), the amount of optional compound (B) is preferably at least 1 wt %. The amount of compound (B) is preferably at most 50 wt %, more preferably at most 40 wt %.

Compound (SW) as used in the present invention is a self-water dispersible compound. By self-water dispersible compound is meant a compound that is insoluble in water and itself capable of being dispersed into water (i.e., without requiring the use of a separate emulsifier or other dispersing aid) or, water can be added to the compound to form a stable dispersion (i.e., the dispersion should have at least 24 hours, preferably at least one month shelf stability at 20° C., and/or should have at least 10 days shelf stability at 60° C.).

A compound (SW) is hence a compound which is insoluble in water and itself capable of forming a stable dispersion in water (the dispersion can be formed by any method known by the skilled person) with a shelf stability of at least 24 h, preferably at least one month at 20° C. and/or at least 10 days at 60° C. By shelf stability is meant that the dispersed colloidal state of the particles is preserved in the dispersion as verified by particle size measurements using light scattering.

Surfactants and emulsifiers are defined as amphiphilic compounds consisting of two distinct parts, one which is soluble in a specific fluid (lyophilic) and one which is insoluble (lyophobic). When the fluid is water, the parts are respectively referred to as hydrophilic and hydrophobic. A fundamental property of surfactants and emulsifiers is their tendency to adsorb at surface and interfaces, i.e. at a boundary between any two immiscible phases, which is driven by the lowering of the free energy of the boundary (cf. "Surfactants and Polymers in Aqueous Solutions" by B. Jönsson, B. Lindman, K. Holmberg and B. Kronberg, J. Wiley and Sons, p 1-4, Chichester, England (1998).

To facilitate the water dispersion, hydrophilic groups are introduced into the backbone of compound (SW). The groups may be selected from ionic or non-ionic hydrophilic groups and are capable to render the compound (SW) dispersible in aqueous medium either directly or after the reaction with a neutralizing agent to form a salt. Hydrophilic groups particularly suitable for the present invention are ionic hydrophilic groups, more particularly anionic groups. Preferred hydrophilic groups are selected from carboxylic acids, sulfonic acids, phosphoric acids and mixtures thereof, as well as tertiary amine and homo- or copolymers of alkoxide compounds such as (mono-3,3-bis(hydroxymethyl) butyl-methoxy-terminated polyethylene glycol (Ymer®N120). More preferred hydrophilic groups are selected from carboxylic acids, sulfonic acids, phosphoric acids and mixtures thereof, as well as tertiary amines. Most preferred hydrophilic groups are carboxylic acids.

In contrast to surfactants and emulsifiers wherein the hydrophilic moieties are located in a distinct part of the molecule, preferred compounds (SW) have a random distribution of the hydrophilic groups in the molecule. Hence, compounds (SW) exclude all the dispersing aids such as emulsifiers, surfactants and the like.

The molar mass of compound (SW) is typically at least 500 Daltons as calculated based on the theoretical chemical structure of the compound or as measured by gel permeation chromatography calibrated with polystyrene standards. Compound (SW) has preferably a number average molecular weight of at least 1000, more preferably of at least 2000 as measured by gel permeation chromatography. The number-average molecular weight (Mn) is determined by conventional gel permeation chromatography (GPC) with polystyrene standards EasyCal from Polymer Laboratories (Molecular Weight range: 200-400.000 g/mol). A small portion of sample is dissolved in tetrahydrofuran (THF) and injected into a liquid chromatograph (Merck-Hitachi L7100) equipped with 3 PLGel Mixed-D LS polystyrene divinylbenzene GPC columns (300 mm×7.5 mm×5 μm). The components of the sample are separated by the GPC columns based on their molecular size in solution and detected by a Refractive Index detector. Data were gathered and processed by Polymer Laboratories Cirrus GPC software.

Compounds (SW) as used in the present invention are generally selected from photopolymerizable self-water dispersible compounds (SW1), non photopolymerizable self-water dispersible compounds (SW2) and mixtures thereof.

Compounds (SW1) are photopolymerizable self-water dispersible compounds, preferably (meth)acrylated self-water dispersible compounds.

Accordingly, compounds (SW1) of the present invention are preferably selected from (meth)acrylated self-water dispersible polyurethanes, (meth)acrylated self-water dispersible poly(meth)acrylics, (meth)acrylated self-water dispersible polyesters, (meth)acrylated self-water dispersible polyethers, (meth)acrylated self-water dispersible polycarbonates, (meth)acrylated self-water dispersible polyepoxys and mixtures thereof. Most preferred are the acrylated forms thereof.

A suitable class of compounds (SW1) is the class of (meth)acrylated self-water dispersible polyurethanes. (Meth)acrylated self-water dispersible polyurethanes are known since long and have been widely described (see e.g. WO 2003/46095, WO 2007/118782, U.S. Pat. No. 7,605, 209, WO 2009/115489, WO 2010/003924). The state of the art generally includes anionically, cationically or nonionically stabilized (meth)acrylated polyurethane dispersions in water. Preferred (meth)acrylated self-water dispersible polyurethanes are stabilized by anionic or cationic hydrophilic groups, more preferably by anionic groups. Anionic and cationic hydrophilic groups are for instance carboxylic acids, sulfonic acids, phosphoric acids and mixtures thereof, as well as tertiary amines or their respective salts. Most preferred hydrophilic groups are carboxylic acids or their salts. They are typically prepared by reacting one or more isocyanates (preferably a di-isocyanate or a tri-isocyanate) with one or more (meth)acrylated compounds containing at least one reactive group capable to react with isocyanate groups (such as a hydroxyl group), at least one hydrophilic compound containing at least one reactive group capable to react with isocyanate groups and, optionally a polyol. The reaction in some cases is performed in the presence of a solvent in order to reduce the viscosity of the polymer. A suitable polymer composition is typically obtained from the capping of an isocyanate-terminated polyurethane oligomer, typically with a mono or poly(meth)acrylated molecule containing at least one reactive group capable to react with isocyanate groups, such as a hydroxyl group. Chain extension, if desired, typically is done by reacting isocyanate end-groups with an aliphatic, alicyclic, aromatic or heterocyclic primary or secondary polyamine or hydrazine. The polyurethane oligomer may also further contain additional (meth)acrylated molecules that are not covalently linked to the polymer. Suitable for use in the composition of the present invention are for example those that have been commercialized under the names of Ucecoat®7674, Ucecoat®7177, Ucecoat®7719, Ucecoat®7770, Ucecoat®7773, Ucecoat®7849, Ucecoat®7571, Ucecoat®7655, Ucecoat®7710, Ucecoat®7698, Ucecoat®7689, Ucecoat®7699, Ucecoat®7733. The (meth) acrylated self-water dispersible polyurethanes have a molar mass of typically at least 500 Daltons as calculated based on the theoretical chemical structure of the compound or as measured by gel permeation chromatography calibrated with polystyrene standards. They have preferably a number average molecular weight of at least 1000, more preferably of at least 2000 as measured by gel permeation chromatography. The number-average molecular weight (Mn) is determined by conventional gel permeation chromatography (GPC) with polystyrene standards EasyCal from Polymer Laboratories (Molecular Weight range: 200-400.000 g/mol). A small portion of sample is dissolved in tetrahydrofuran (THF) and injected into a liquid chromatograph (Merck-Hitachi L7100) equipped with 3 PLGel Mixed-D LS polystyrene divinylbenzene GPC columns (300 mm×7.5 mm×5 μm). The components of the sample are separated by the GPC columns based on their molecular size in solution and detected by a Refractive Index detector. Data were gathered and processed by Polymer Laboratories Cirrus GPC software.

(Meth)acrylated self-water dispersible poly(meth)acrylics may also be used. The state of the art generally includes anionically, cationically or nonionically stabilized (meth) acrylated poly(meth)acrylic dispersions in water. Preferred ones are anionically or cationically stabilized, more preferred ones are anionically stabilized. They can be prepared by any manner known in the art. They can for instance be obtained by the synthesis in a solvent of an acrylic polymer grafted with unsaturated compounds. The solvent can optionally be stripped after the dispersion of said polymer in water. For that purpose, several grafting chemistries have been used including for instance the reaction between carboxylic acid and epoxy (U.S. Pat. No. 4,806,450), between hydroxyl and N-methylol (U.S. Pat. No. 6,808,865), between anhydride and hydroxyl (EP 1,504,067), between carboxylic acid and hydroxyl (US 2006/0148975) or between hydroxyls and isocyanates (WO 2012/013488). A typical example is the reaction of acrylic monomers (methylmethacrylate, butylacrylate, hydroxyethylacrylate, methacrylic acid) in a solvent in the presence of a thermal initiator and a transfer agent followed by the grafting of the polymer with a polyisocyanate and a polyacrylate bearing hydroxyl group (dipentaerythrytol hydroxypentaacrylate) and the neutralization with an amine prior to the dispersion in water. Another route that has been described consists in multi-step emulsion polymerization resulting in a core-shell particle microstructure that has been further grafted for instance by the interfacial reaction of glycidyl methacrylate with the carboxylic acid functionality present on the acrylic polymer like disclosed in J. Odeberg et al., Journal of Applied Polymer Science, Vol. 62, 435-445 (1996). Suitable for use in the present invention are for example those that have been commercialized under the names of Craymul®2715 (Cray Valley), the Craymul®2717 (Cray Valley), the Setaqua®X11747 (Nuplex), the Setaqua®X11751 (Nuplex), the Lux®515 (Alberdingk & Boley), the Lux®805 (Alberdingk & Boley), the Lux®822 (Alberdingk & Boley), the Laromer®LR9016X (BASF).

(Meth)acrylated self-water dispersible polyesters are also suitable. They can be prepared by any manner known in the art. They can for instance typically be obtained from the polycondensation of polycarboxylic acids and polyhydric alcohols in a stoichiometry that defines the molecular weight, the branching and the functionality of the final polymer. The polymer contains suitable hydrophilic groups. The hydrophilic groups may be anionic, cationic or nonionic, they are preferably selected from anionic and cationic groups, more preferably from anionic groups. The polymer must also contain (meth)acrylate group capable to render the final polymer photopolymerizable. The hydrophilic and (meth)acrylate groups may for instance be directly incorporated as monomers in the final polyester. In a specific case, the hydrophilic and/or (meth)acrylate groups are incorporated by grafting the primary functional polyester with suitable reactants capable to attach the functionality on the primary polymer. The polycarboxylic acids which may be used for the formation of these polyesters are selected between saturated or unsaturated aliphatic, cycloaliphatic, aromatic and/or heterocyclic polycarboxylic acids and may be substituted by any suitable functionality. Examples of aliphatic dicarboxylic acids are succinic acid, glutaric acid and adipic acid. The alkylesters corresponding to these polycarboxylic acids may also be used if the polyester is prepared by transesterification, with methyl and ethyl esters being preferred. The term "polycarboxylic acid" as used herein extends also to suitable anhydrides such as e.g. phthalic anhydride and/or trimellitic anhydride.

The polyhydric alcohols which may be used for the preparation of these polyesters are selected between aliphatic, cycloaliphatic, aromatic and/or heterocyclic compounds and may be substituted by any suitable functionality. Examples of suitable polyhydric alcohols include ethylene glycol, propylene glycol, 1,3-propanediol, 1,3-butanediol, 1,4-butanediol, 1,5-pentanediol, 1,6-hexanediol, neopentyl glycol, diethylene glycol, dipropylene glycol, triethylene glycol, tripropylene glycol, 2-methyl-1,3-pentanediol, 2,2, 4-trimethyl-1,3-pentanediol, 1,4-cyclohexanedimethanol, (hydrogenated) bisphenol A and/or ethylene oxide adducts or propylene oxide adducts of (hydrogenated) bisphenol A. Triols or tetraols such as trimethylolethane, trimethylolpropane, glycerin and/or pentaerythritol may also be used. Polyesters can also be obtained by the ring opening polymerization of lactones and lactides. The polyester may also contain a long chain saturated or unsaturated fatty acid or a derivate consisting of fatty acid dimer or fatty acid dimer diol. An example of self-water dispersible polyesters (meth) acrylates is provided in patent.

Another suitable class of compounds (SW1) is the class of (meth)acrylated self-water dispersible polyethers. (Meth) acrylated self-water dispersible polyethers can be prepared by any manner known in the art. They can for instance be prepared by esterification of hydroxyfunctional polyethers with (meth)acrylic acid. Hydroxyfunctional polyethers can be obtained by ring-opening homo- or copolymerization of cyclic ethers such as tetrahydrofuran, ethylene oxide and/or propylene oxide or can be prepared by reacting polyhydroxy alcohols with ethylene and/or propylene oxide. It is possible to obtain linear or branched polyethers with random or block copolymer architectures. Preferred (meth)acrylated self-water dispersible polyethers are those prepared from propylene oxide.

Another suitable class of compounds (SW1) is the class of (meth)acrylated self-water dispersible polyepoxys. Suitable (meth)acrylated self-water dispersible polyepoxys include the compounds described in U.S. Pat. No. 5,548,005. These compounds are typically prepared by reacting acrylic acid or methacrylic acid with a hydrophilic polyepoxy that contains lateral polyethylene(propylene) glycol segments. A hydrophilic polyepoxide of this type can be prepared by reacting a polyepoxide with a primary or secondary polyethylene (propylene) glycol monoether amine (such as Jeffamine®), or by reacting an OH-group containing polyepoxide with a diisocyanate and thereafter with a polyethylene(propylene) glycol monoether. It is also possible that the functionality capable to render the polymer dispersible in water is an ionic functionality, typically an anionic functionality. These compounds are then typically prepared by reacting a polyepoxide with a primary or secondary polyethylene(propylene) glycol monoether amine bearing a sulfonate group (such as PolyEPS®), or by reacting an OH-group containing polyepoxide with an anhydride or with a polyisocyanate and thereafter with a compound bearing an hydroxyl and a carboxylic acid on the same molecule, like glycolic or lactic acid, or alternatively a compound bearing an amine and a carboxylic acid on the same molecule, like glycine, alanine or other amino-acids.

Preferred compounds (SW1) of the present invention are selected from (meth)acrylated self-water dispersible polyurethanes, (meth)acrylated self-water dispersible poly(meth) acrylics, (meth)acrylated self-water dispersible polyesters, (meth)acrylated self-water dispersible polycarbonates, (meth)acrylated self-water dispersible polyepoxys and mixtures thereof. Particularly preferred are the acrylated forms thereof.

More preferred compounds (SW1) as used in the invention are (meth)acrylated self-water dispersible polyurethanes, (meth)acrylated self-water dispersible poly(meth) acrylics, (meth)acrylated self-water dispersible polyesters and/or (meth)acrylated self-water dispersible polyepoxys. Particularly preferred are the acrylated forms thereof.

Most preferred are (meth)acrylated self-water dispersible polyurethanes, (meth)acrylated self-water dispersible poly (meth)acrylics, and/or (meth)acrylated self-water dispersible polyepoxys and especially the acrylated forms thereof. More in particular, (meth)acrylated self-water dispersible polyurethanes, (meth)acrylated self-water dispersible polyepoxys and especially the acrylated forms thereof are preferred. Very particularly, (meth)acrylated self-water dispersible polyurethanes and especially the acrylated forms thereof are preferred.

Compounds (SW2) as used in the present invention are non photopolymerizable self-water dispersible species. By non photopolymerizable species is meant species that do not contain any photopolymerizable carbon-carbon double bond such as vinyl, allylic or (meth)acrylic double bonds. It is further known by the skilled person that carbon-carbon double bonds in an aromatic ring are not considered as photopolymerizable double bonds and compound (SW2) may comprise such double bonds. When a compound (SW2) is used in the present invention, at least one photopolymerizable compound (B) is present in the (ACD).

Compounds (SW2) comprise any self-water dispersible polymer known in the art. Typical compounds (SW2) are self-water dispersible polyurethanes. These are polyurethane/polyureas dispersed in a continuous aqueous phase with particle sizes typically ranging from 1 to 999 nm. The colloidal stability of polyurethane dispersions is generally achieved by anionic stabilization, although cationic or nonionic stabilization may occur. They are preferably stabilized by hydrophilic groups selected from salts of carboxylic acids, sulfonic acids, phosphoric acids and mixtures thereof. Most preferred hydrophilic groups are carboxylic acids salts. Polyurethanes molecular weights can range from low to high molecular weight depending on the presence of a chain extension step, transforming a low molecular weight isocyanate-functional pre-polymer into a high molecular weight polyurethane/polyurea by the reaction with polyamines in the aqueous phase or after spontaneous hydrolysis. They are free of residual isocyanate and have a variable amount of volatile organic content (VOC) depending on the use of solvent during the synthesis. Polyurethane dispersions have typically 30-65% solid content and provide a wide range of coating hardness. Products from this category can be found under the commercial name Daotan®.

Other compounds (SW2) can be obtained from other polymer backbones comprising self-water dispersible poly (meth)acrylics, self-water dispersible polyepoxys, self-water dispersible polyesters, self-water dispersible alkyd polymers and self-water dispersible phenolic resins. Those products can for instance be found under the commercial trade names Macrynal®, Viacryl®, Beckopox®, Duroxyn®, Resydrol® and Phenodur®. It is also possible to find hybrid dispersions combining any of these polymer categories in one single polymer dispersion.

More preferred compounds (SW2) as used in the invention are self-water dispersible polyurethanes.

In the case the compound (SW) contains hydrophilic groups that have to be neutralized to make it dispersible in water, the neutralization is usually performed before the dispersion step. This is applicable whatever the polymer backbone used for the purpose of the invention. Typical reactions are the reactions between a carboxylic acid, a sulfonic acid or a phosphonic acid present on the compound (SW) with an amine or an inorganic base. Ammonia and organic amines can be used although tertiary organic amines are especially preferred in the case of polyurethane backbones because of their inertness towards isocyanates possibly present in the composition prior to dispersion in water.

In some cases, the synthesis of compound (SW) may require the use of a solvent. Typical solvents used for this purpose are low boiling point solvents with a good polymer solvency and include ketones, typically acetone and methylethylketone. The solvent is generally removed after the dispersion step usually under reduced pressure at a temperature between 20 and 90° C. In specific cases, a solvent with a higher boiling point may be used such as N-methylpyrrolidone or N-ethylpyrrolidone. In these specific cases, the solvent may not be removed from the polymer dispersion and can even participate to the reduction of the minimum film formation temperature.

In some syntheses of polyurethane backbones of the (SW1) and (SW2) types, a chain extension reaction is performed. It is usually performed before or immediately after dispersion in the aqueous phase, generally at a temperature between 5 and 90° C., more typically between 5 and 25° C. When the chain extension is performed before the dispersion in water, the molecular weight increase leads to a viscosity increase. Chain extension before dispersion is hence generally limited to cases where the viscosity increase is limited typically to a viscosity after extension of at most 100000 mPa·s at 100° C. The chain extension is preferably performed immediately after dispersion in the aqueous phase.

The dispersion (ACD) according to the present invention also comprises at least one photoinitiator (PI). Photoinitiators are molecules that absorb photons upon irradiation with light and form reactive species from their excited state, which initiate consecutive reactions ("UV Coatings: Basics, Recent Developments and New Applications", Reinhold Schwalm; Elsevier (2007), p. 84). Typical photoinitiators are described in "The Chemistry of Free Radical Polymerization", edited by Graeme Moad and David H. Solomon; Pergamon (1995), p. 84 to 89 or in "Photoinitiators for Free Radical, Cationic and Anionic Polymerization", Vol. III, p. 327, J. Wiley & Sons (1998) by Crivello et al. In the present invention, the photoinitiator (PI) typically initiates radical polymerization of the photopolymerizable compounds.

The photoinitiator (PI) usable in the present invention are typically solid and/or liquid photoinitiator (PI). They can typically be selected from hydroxyketones, aminoketones, benzildimethyl-ketals, acyl phoshines, benzophenone derivatives, thioxanthones and solution thereof in an organic solvent or mixtures thereof including eutectic mixtures. Typical examples of these products are those commercialized under the names Lucirin TPO, Irgacure® 149, Irgacure® 184, Irgacure® 369, Irgacure® 500, Irgacure® 651, Irgacure® 784, Irgacure® 819, Irgacure® 907, Irgacure® 1700, Irgacure® 1800, Irgacure® 1850, Irgacure® 2959, Darocur® 1173, Darocur® 4265. Preferred are liquid photoinitiator (PI) such as Irgacure® 500, Irgacure® 1700, Darocur® 1173, Darocur® 4265 or eutectic mixtures comprising benzophenone such as a mixture of ethyl-4-dimethylamino benzoate, 2,2-dimethoxy-1,2-diphenylethan-1-one, benzophenone, 2,4,6-trimethylbenzoyl-diphenylphosphine oxide. A particularly preferred photoinitiator (PI) is Irgacure® 500.

The addition of photoinitiator (PI) can be done at any time before, during or after the dispersion of compound (SW) in water and at the latest at least part of the photoinitiator (PI) is added before the polymerization of the dispersion (ACD) by photoinduced polymerization. A liquid photoinitiator (PI) is preferred when the photoinitiator (PI) is added after dispersion. Solid and/or liquid photoinitiator (PI) systems soluble in compound (SW) can be used when the photoinitiator (PI) is added prior to dispersion of compound (SW) into water.

The addition of the photoinitiator (PI) is typically performed at a temperature ranging from 1 to 80° C., preferably from 20 to 60° C.

The photopolymerizable aqueous colloidal dispersion (ACD) according to the present invention may optionally also comprise at least one photopolymerizable compound (B). When a compound (SW2) is used in the present invention, at least one photopolymerizable compound (B) is present in the (ACD).

The photopolymerizable compound (B) is preferably selected from (meth)acrylated compounds. Suitable compounds (B) are mono and poly(meth)acrylated monomers. Examples of such compounds (B) are butyl(meth)acrylate, methyl(meth)acrylate, isobutyl(meth)acrylate, 2-ethylhexyl(meth)acrylate, cyclohexyl(meth)acrylate, n-hexyl(meth)acrylate, isobornyl(meth)acrylate, iso-octyl(meth)acrylate, n-lauryl(meth)acrylate, octyl/decyl(meth)acrylate, 2-hydroxyethyl(meth)acrylate, phenoxyethyl(meth)acrylate, nonylphenolethoxylate mono(meth)acrylate, 2-(−2-ethoxyethoxy)ethyl(meth)acrylate, 2-butoxyethyl(meth)acrylate, 1,6-hexanediol di(meth)acrylate (HDD(M)A), di or tri propylene glycol di(meth)acrylate (DPGD(M)A, TPGD(M)A), ethoxylated and/or propoxylated neopentylglycol di(meth)acrylate, pentaerythritol tri(meth)acrylate (PETI(M)A) and the ethoxylated and/or propoxylated derivatives thereof, trimethylolpropane tri(meth)acrylate (TMPT(M)A) and the ethoxylated and/or propoxylated derivatives thereof, di-trimethylolpropane tri(meth)acrylate (diTMPT(M)A), glycerol tri(meth)acrylate and the ethoxylated and/or propoxylated derivatives thereof, dipentaerythritol hexaacrylate, dianhydrohexitols di(meth)acrylates (like isosorbide di(meth)acrylate) and the ethoxylated and/or propoxylated derivatives thereof, bisphenol A di(meth)acrylate and the ethoxylated and/or propoxylated derivatives thereof, phenylglycidylether(meth)acrylate and the ethoxylated or/and propoxylated derivatives thereof, the (meth)acrylates obtained from the esterification with (meth)acrylic acid of aliphatic glycidyl ethers, especially those wherein the alkyl chain comprises from 6 to 24 carbon atoms, more preferably from 8 to 18 carbon atoms, and/or of glycidyl esters of saturated and unsaturated carboxylic acids, especially the glycidyl esters of long chain alkyl carboxylic acids wherein the alkyl chain comprises from 6 to 24 carbon atoms, more preferably from 8 to 18 carbon atoms. Preferred compounds (B) are isobornyl(meth)acrylate, the (meth)acrylates obtained from the esterification with (meth)acrylic acid of glycidyl esters of long chain alkyl carboxylic acids wherein the alkyl chain comprises from 8 to 18 carbon atoms, phenoxyethyl(meth)acrylate, hexanediol di(meth)acrylate, polypropylenglycol di(meth)acrylate, isosorbide di(meth) acrylate, tricyclodecanediol di(meth)acrylate, trimethylolpropane tri(meth)acrylate and the ethoxylated and/or propoxylated variants of trimethylol propane tri(meth)acrylate, glycerol tri(meth)acrylate and the ethoxylated and/or propoxylated derivatives thereof, pentaerithrytol tri(meth)acrylate, ditrimethylolpropane tetracrylate, dipentaerithrytol hexacrylate and mixtures thereof. Most preferred compounds (B) are their acrylated derivatives and mixtures of these. A class of suitable compounds (B) of the present invention are compounds (B) that do not contain ethoxylated moieties. Another class of suitable compounds (B) of the present invention are compounds (B) that do not contain ethoxylated and propoxylated moieties.

Preferred compound (B) as used in the present invention has typically a low water solubility (less than 20 g/l, at room temperature).

When used, compound (B) is introduced at any moment of the process before the polymerization step. It is preferably introduced before dispersion, it is more preferably blended with compound (SW) before dispersion. Irrespective of the moment of introduction in the process, at least part of compound (B) will typically be located and/or will migrate in the dispersed phase of the dispersion (ACD). At least part of compound (B) will copolymerize with compound (SW) during the photoinduced polymerization step.

In a first particular embodiment of the present invention, there is provided a process for the preparation of colloidal polymerized particles (CPP) comprising the steps of:
(a) forming a photopolymerizable aqueous colloidal dispersion (ACD) comprising:
  (i) at least one photopolymerizable self-water dispersible compound (SW1),
  (ii) at least one photoinitiator (PI),
  (iii) optionally at least one photopolymerizable compound (B),
(b) polymerizing the photopolymerizable aqueous colloidal dispersion (ACD) by photoinduced polymerization to form a dispersion of colloidal polymerized particles (DCPP),
(c) optionally isolating the particles obtained at step (b) from the aqueous phase to obtain isolated colloidal polymerized particles (ICPP).

In a second particular embodiment of the present invention, there is provided a process for the preparation of colloidal polymerized particles (CPP) comprising the steps of:
(a) forming a photopolymerizable aqueous colloidal dispersion (ACD) comprising:
  (i) at least one non photopolymerizable self-water dispersible compound (SW2),
  (ii) at least one photoinitiator (PI),
  (iii) at least one photopolymerizable compound (B),
(b) polymerizing the photopolymerizable aqueous colloidal dispersion (ACD) by photoinduced polymerization to form a dispersion of colloidal polymerized particles (DCPP),
(c) optionally isolating the particles obtained at step (b) from the aqueous phase to obtain isolated colloidal polymerized particles (ICPP).

In this second particular embodiment of the present invention, at least one photopolymerizable compound (B) is present in the dispersion (ACD) with at least one compound (SW2) to render the dispersion (ACD) photopolymerizable.

In a third particular embodiment of the present invention, there is provided a process for the preparation of colloidal polymerized particles (CPP) comprising the steps of:
(a) forming a photopolymerizable aqueous colloidal dispersion (ACD) comprising:
  (i) at least one photopolymerizable self-water dispersible compound (SW1) and at least one non photopolymerizable self-water dispersible compound (SW2),
  (ii) at least one photoinitiator (PI),
  (iii) optionally at least one photopolymerizable compound (B),
(b) polymerizing the photopolymerizable aqueous colloidal dispersion (ACD) by photoinduced polymerization to form a dispersion of colloidal polymerized particles (DCPP),
(c) optionally isolating the particles obtained at step (b) from the aqueous phase to obtain isolated colloidal polymerized particles.

In a first variant of these three embodiments, compound (SW) and/or compound (B) are compounds comprising at least one functional group different from a photopolymerizable carbon-carbon double bond. Typical functional groups are epoxide, hydroxyl, amine, isocyanate, carboxylic acid. Another functional group suitable for the present invention is thiol. According to the present invention compound (B) may also comprise at least one heteroatom such as phosphorus, silicon, halogens such as fluorine or bromine. The polymerized particles obtained from a dispersion (ACD) comprising such compounds are typically functional polymerized particles. The amount of functional groups ranges from 0.01 to 10 mmol per gram of polymerized particle as determined by methods known by the skilled person, typically by titrimetry. The presence of functional groups in the polymerized particles advantageously offers the possibility to generate couplings with a matrix containing compounds bearing co-reactive functional groups. The particles are then strongly bonded to the matrix what can be advantageous in terms of mechanical toughness or reinforcement. This is the case for functional groups such as epoxide, hydroxyl, amine, isocyanate, carboxylic acid. Chemical functionalities acting as transfer agents during the polymerization, such as thiol groups, are particularly suited to modify the crosslinked structure of the particles. The presence of heteroatoms such as phosphorus and/or halogenated moieties is particularly suited for providing fire or flame retardant properties. Silicon and fluorine functionalities are helpful in modifying the surface activity of the material.

In a second variant of these three embodiments, the dispersion (ACD) further comprises at least one additive (C). The additive (C) is selected from non reactive compounds. By non reactive compound is meant a compound that will not react with any of the components of the dispersion (ACD) nor take part to the photoinduced polymerization so that the additive (C) will not be chemically bonded to the colloidal polymerized particles.

The additives (C) suitable in the present invention are solid and/or liquid additives (C). The additives (C) are preferably not soluble in water. By not soluble is meant that the solubility of the compound in water is lower than 1 g/l at room temperature.

Preferred additives (C) are selected from solid and/or liquid non reactive additives that are not soluble in water.

Examples of additives (C) suitable in the present invention include dyes, organic and/or inorganic corrosion inhibitors, catalysts, UV-absorbers, crosslinkers, anti-fouling agents, biocides, hydrophobicity modifiers such as silicon and fluoro compounds, antiscaling agents, freezing depressors, phase change compounds and mixtures thereof. Other suitable additives (C) are additives that impart flame or fire retardant properties. Another class of suitable additives (C) are biologically active compounds like therapeutic molecules, proteins or a molecule that combines the two elements by covalent bonding for use for instance in cell targeting applications. Preferred additives (C) are dyes, corrosion inhibitors, biocides, anti-fouling agents, crosslinkers, phase change compounds. Examples of such compounds are commercialized under the names Neozapon® (metal-complex dye), 8-hydroxyquinoline (corrosion inhibitor), Irgarol® 1051 (biocide) and long chain hydrocarbons such as hexadecane and paraffin wax (phase change compounds). More preferred additives (C) are corrosion inhibitors, biocides, anti-fouling agents, crosslinkers, phase change and flame or fire retardant compounds.

The additive (C) can be introduced at any moment of the process before the photoinduced polymerization step. It is preferably introduced before the dispersion, it is more preferably blended with compound (SW) before dispersion. Irrespective of the moment of introduction in the process, at least part of additive (C) will typically be located and/or will migrate in the dispersed phase of the dispersion (ACD).

When present, the additive (C) is used in a total amount of from 0.1 to 60 wt % based on the dry content of the dispersion (ACD). Preferably, the additive (C) is present in a total amount of at least 1 wt %, more preferably of at least 5 wt %. It does preferably not exceed 50 wt %, more preferably it does not exceed 40 wt %.

It is believed that the choice of the composition of the dispersion (ACD) and photoinduced polymerization parameters such as the irradiation time, irradiance, temperature, atmosphere such as air or nitrogen will impact the migration rate of the additive (C) out of the (CPP) providing a delayed or controlled release mechanism for the additive (C) into the surrounding medium. A triggering mechanism can also be built in order to release the encapsulated additive (C) from the (CPP) to a medium by application of an external stimulus such as pH, temperature, light.

In a third variant of these three embodiments, the dispersion (ACD) comprises at least one non self-water dispersible compound (D). By non self-water dispersible compound is meant a compound that is insoluble in water and requires the use of a separate emulsifier or other dispersing aid to form a stable dispersion in water (i.e., the dispersion should have at least 24 hours, preferably at least one month shelf stability at 20° C., and/or should have at least 10 days shelf stability at 60° C.). Compounds (D) can be photopolymerizable or non photopolymerizable. They can be the same or different from compounds (B). Examples of suitable compounds (D) are poly(meth)acrylics, polystyrene-co-(meth)acrylics, polyesters, polyurethanes, polyvinyls, epoxy resins, alkyd resins, unsaturated polyesters and combinations thereof.

The compound (D) is introduced in the dispersion (ACD) in the form of an aqueous dispersion obtained by means of emulsifier(s) and/or other dispersing aid(s) such as surfactants being ionic or non-ionic, polymeric or monomeric, and mixtures thereof. Non-limiting examples of dispersing aids and emulsifiers are sodium lauryl sulphate, alkylphenol ethoxylates or alkyl ethoxylates and their sulfonated form. The surfactant can be polymerisable due to the presence of a vinyl, allyl or (meth)acrylic function on the molecule.

When used, the amount of (D) in the dispersion (ACD) ranges from 1 to 70 wt %, and the amount of emulsifier and/or other dispersing aid ranges from 0.1 to 10 wt %, preferably from 1 to 5 wt % based on the dry content.

The compound (D) can be introduced at any moment of the process before the photoinduced polymerization step. It is preferably introduced after the dispersion and prior to the photoinduced polymerization step.

The process according to the invention further comprises a step of polymerizing the dispersion (ACD) by photoinduced polymerization to form a dispersion of colloidal polymerized particles (DCPP) in the aqueous phase. By photoinduced polymerization is meant a polymerization initiated by the production of active species able to initiate a polymerization by exposure to actinic radiation such as visible light, ultraviolet radiations, γ-rays, X-rays.

In the process according to the invention, the dispersion (ACD) is preferably polymerized by exposure to light with a wavelength ranging from 172 nm to 450 nm. This radiation can be emitted by any type of light source including carbon arc lights, low, medium and high pressure mercury vapor lamps, plasma arc lamps, xenon flash lamps, light emitting diodes, ultraviolet light emitting lasers and excimer lamps as further described in detail in "UV Coatings: Basics, Recent Developments and New Applications", Reinhold Schwalm; Elsevier (2007), p 45-48, or "Radiation Curing: Coatings and Printings Inks", Patrick Glöckner; Vincentz Network (2008), p 118-120.

The irradiance in the UV-A spectral range (i.e. between 320-400 nm) is typically at least 0.1 mW/cm$^2$.

The photoinitiator upon exposure to the actinic radiation will undergo a photolysis producing radical species that will initiate the photoinduced polymerization and/or copolymerization of the photopolymerizable compounds present in the dispersion (ACD).

The choice of the composition of the dispersion (ACD) and photoinduced polymerization parameters such as the irradiation time, irradiance, temperature, atmosphere such as air or nitrogen will allow controlling the glass transition temperature of the formed (CPP) and hence the mechanical performances of the (CPP). Hence the (CPP) can be tailored from soft to hard particles.

The photoinduced polymerization used in the present invention can be performed in any suitable equipment. It can for instance be performed in a batch reactor but also in continuous flow systems. Some examples of photochemical reactors are immersion type reactors, falling films reactors, parallel plate reactors also referred to as through reactors, cylindrical reactors also called tubular reactors with for instance an annular coaxial radiation field as, for instance, described in "Technologie Photochimique" by A. M. Braun, M-T. Maurette and E. Oliveros, Presses Polytechniques Romandes, p 143-189, Lausanne (1986).

In a particular embodiment of the present invention applicable to the supra embodiments and variants, the process comprises a further isolation step wherein the (CPP) are isolated from the aqueous phase. The isolated colloidal polymerized particles (ICPP) can be obtained by any suitable technique, the (CPP) can for instance be isolated by spray drying, freeze drying, centrifugation with or without the use of precipitation or coagulation. The isolation step may take place at any moment after the photoinduced polymerization step.

The process according to the present invention has several advantages.

It discloses the preparation of a colloidal dispersion of polymerized particles (DCPP) by photoinduced polymerization of a self-water dispersible compound in aqueous medium advantageously in the absence of emulsifier or other dispersing aid. The presence of such species may adversely affect the properties of coatings where they are present, they may for instance imply a higher water sensitivity and migrate out of the coating with an adverse modification of the surface properties and also result in application defects due to the presence of foam during application.

The process is not limited to the photoinduced polymerization of translucent dispersions. It is also suitable for systems with a high degree of opacity.

The process according to the present invention advantageously may present a high productivity rate thanks to the possibility of polymerizing rapidly dispersion (ACD) having high dry contents by photoinduced polymerization. It is for instance possible to polymerize the dispersion (ACD) having a dry content as high as 35 wt %. The reaction takes place in short times. For instance, in a liter-sized batch reactor, reaction times in the order of minutes have been obtained. For liquid layers, the polymerization times can be reduced to seconds with proper light input. Hence, continuous flow reactors, annular, planar or tubular, can be considered as effective for the rapid photopolymerization of these dispersions.

The glass transition temperature ($T_g$) as well as the degree of hardness of the particles of the (DCPP) can be controlled by various process parameters such as particle composition, irradiation conditions such as power and spectrum of the light source, time and temperature. The $T_g$ of the particles of the CDPP typically ranges from −80 to 150° C.

The process according to the present invention also permits to encapsulate or entrap additives (C) in the colloidal polymerized particles. The additive(s) can be released subsequently into the surrounding medium following a delayed, controlled or triggered mechanism.

The process according to the invention permits to obtain dispersions of colloidal polymerized particles (DCPP) and isolated colloidal polymerized particles (ICPP) having unique properties opening a wide range of applications.

The present invention also relates to a dispersion of colloidal polymerized particles (DCPP) obtained and/or obtainable according to the process of the present invention.

The present invention further relates to the isolated colloidal polymerized particles (ICPP) obtained and/or obtainable according to the process of the present invention.

The colloidal polymerized particles in dispersion and the isolated colloidal polymerized particles resulting from the process have typically an average size ranging from 1 to 999 nm as determined by light scattering measurement. The average size is more typically at least 30 nm, most typically at least 40 nm. The average size of the particles is more typically at most 800 nm, most typically at most 700 nm.

The average size of the colloidal polymerized particles make them particularly suitable for use in thin layers applications, such as inks, thin coatings, adhesives, membranes. The small size also provides a high specific surface area (surface-to-volume ratio) which enhances the interfacial activity with the surrounding matrix.

The colloidal polymerized particles have a $T_g$ ranging from −80° C. to 150° C. depending on the composition and process parameters. The colloidal polymerized particles range from soft to hard particles making them suitable for a variety of applications.

The colloidal polymerized particles may also encapsulate or entrap additives which can be released subsequently following a delayed, controlled or triggered mechanism. In contrast to the common addition of additives by blending in a composition, the use of an encapsulated/entrapped additive will advantageously allow the delayed effect of the additive into the surrounding medium. If the additive release is done through a triggering mechanism, the effect can advantageously be produced on demand.

The colloidal polymerized particles may also comprise functional groups to allow further reactions with other compounds. It offers the possibility to generate couplings with a matrix containing compounds bearing co-reactive functional groups. The particles are then strongly bonded to the matrix what can be advantageous in terms of mechanical toughness or reinforcement.

The dispersion (DCPP) and particles (ICPP) obtained and/or obtainable according to the process of the present invention can be used in many applications. Some non-exhaustive examples of applications are herein disclosed.

The (DCPP) and (ICPP) obtained and/or obtainable according to the process of the present invention can advantageously be used as fillers in combination with organic binder(s) in compositions to form composite materials.

The colloidal size of the (CPP) allows their use in all types of composite materials ranging from bulk composites to thin layer composite systems (minimum thickness of 500 nm). Non limiting examples of such composites are construction materials (cars, aircrafts, building), coatings, inks, adhesives, membranes.

If the composition to form composite materials is an aqueous based composition, both the (DCPP) and (ICPP) can typically be used.

If the composition to form composite materials is a non-aqueous composition, both the (DCPP) and (ICPP) can typically be used, however the (ICPP) will preferably be used.

In contrast to other types of fillers like inorganic oxides, such as silica, zinc oxide, alumina, the (CPP) have a refractive index closer to the refractive index of typical organic materials which is favorable to obtain transparent, non-scattering composites even at particle sizes larger than 50 nm.

The particles can be used as reinforcing material or toughening material in a composite. When the particles are rigid and stiff, e.g. with a glass transition temperature ($T_g$) higher than the service temperature, a reinforcing effect is achieved. When the particles are soft particles ($T_g$ below the service temperature) in a rigid matrix toughness, impact resistance and flexibility of the composite material will be improved.

The particles can be used in a thin composite layer applied on a surface in order to create a structured surface. The surface roughness obtained may advantageously bring properties like water or oil repellency for applications like for instance easy cleanable surfaces, anti-graffiti, dirt repellency. The surface roughness may also modify the optical properties of the coating and lead to a matt aspect or antireflective properties.

Soft cross-linked (rubbery) particles may be used in composites in view of obtaining soft touch and soft feeling effects.

The colloidal polymerized particles obtained and/or obtainable according to the second variant of the present invention are loaded with an additive (C). Such loaded particles can be used in a composite as carrier particles with subsequent release of the additive in the matrix. Release can take place in a delayed way in relation with the stiffness of the particles or can possibly be activated by an external stimulus such as light, temperature, pH.

The carrier particles loaded with an additive can be used in many applications. An example is the incorporation of cross-linkers in the particles in order to convert a 2 component coating system (2K system) into a 1 component coating system (1K system). In a 2K system, the end user is typically provided with 2 separate components, the main resin and the cross-linker. The cross-linker is usually blended to the main resin just before use due to the limited shelf life of the mixture. When encapsulated in the carrier particles, the cross-linker is isolated from the surrounding medium and hence can be put in presence of the main resin with no or limited shelf life problem. Upon suitable conditions, the cross-linker can be released in order to initiate the cross-linking reaction. The end user might thus be provided with a 1K system having the performances of a 2K system.

Another example is the loading of corrosion inhibitors in the particles for use in anti-corrosive coatings. The corrosion inhibitor may for instance be released upon pH activation. Still another example is the storage of anti-fouling agents or biocides into carrier particles for gradual release into the surrounding environment, for instance, in protective coatings for marine applications.

The particles may also be used in self-assembled layers, for instance at a liquid-liquid interface. An example of such application is the formation of particle stabilized emulsions known as "Pickering" emulsions. In this application, the possibility to polymerize the particles at a variable degree of cross-linking as well as the freedom to tailor the polymer backbone provide approaches to tune the stiffness of the particles from soft to highly rigid which will control the deformability of the self-assembled layer.

The invention will now be described in more details in the examples below, which in no way are intended to be limiting.

Throughout the invention and in particular in the examples the following processes and measuring methods have been applied.

Process for the preparation of the aqueous colloidal dispersion (ACD):

An aqueous colloidal dispersion (ACD) is typically prepared by adding gradually the self-water dispersible resin compound (SW), optionally comprising compounds (B) and/or (C) as described in the invention, to water under shearing using a Cowles disperser fitted with a 6 cm saw-tooth blade and rotating at a speed between 500 and 1500 rpm. The addition of the resin is usually achieved in 30 min. Optionally, a compound (D) can be added together with the compound (SW), and optional compound (B) and/or (C).

Process for the photoinduced polymerization of the particles:

The photoinduced polymerization reactions were conducted following several ways.

(i) Immersion Type Reactor:

The lab photoreactor system UV-RS2 (Heraeus) is built up of a medium-pressure mercury UV immersion lamp (TQ150, 150 W, about 30 W/cm), a quartz immersion tube and a quartz cooling tube fitted in the center of the reactor vessel. The lamp is cooled by feeding tap water through the double wall envelope separating the lamp from the reactor vessel.

After a start-up period of 5 min to reach a constant radiant power of the lamp, 700 mL of aqueous colloidal dispersion is added to the reactor. A vortex is created by vigorous mixing using a magnetic stirrer at 700 rpm. Then, while agitating, the dispersion is exposed to UV-light during maximum 30 min.

The irradiance is determined in the UV-A range using a UV power meter (Hamamatsu C6080-03 calibrated at 365 nm). The irradiance is about 35 mW/cm$^2$ at the position of maximum output near the cooling tube. The experiments are conducted at room temperature.

(ii) Parabolic Through Reactor:

A small flat-bottom container, e.g. a Petri dish or an aluminum cup, is filled with aqueous colloidal dispersion to a height of 1-2 mm forming a thick liquid layer. The vessel is placed onto a cooled steel substrate straight under a 100 W medium-pressure mercury arc lamp. The UV-A irradiance is determined as described in (i). The irradiance is about 6 mW/cm$^2$ at the location of the vessel. The dispersion is exposed to UV-light from the top for maximum 60 s.

(iii) Flexible Tubular Continuous Flow Photoreactor:

The prototype of the continuous flow reactor is mainly composed of a flexible PVC tubing (Tygon) with an internal diameter of 3.2 mm and an outer diameter of 4.8 mm. The tube is folded back-and-forth to form parallel lanes of at least 10 cm long fixed on a flat rigid substrate covered with an aluminum foil. The folded tube is exposed to UV-light using a 200 W medium pressure mercury lamp fitted in a rectangular housing with a suitable reflector and protected with a glass window. The lamp was located at a distance of 5.2 cm from the tubing resulting in a UV-A irradiance of 46 mW/cm$^2$ at the position of the tube. By default, the total effectively exposed tube length is limited to 1 m (10×10 cm) by masking the excess tube area. However, with a single lamp the exposed length could easily be increased to 2.3 m by multiplying the number of lanes. The aqueous colloidal dispersion is fed into the reactor using a peristaltic pump, with an adjustable rotational speed control, and collected at the end in glass vials. In the examples the flow rate could be controlled up to 1.8 L/h.

Dry content determination: The dry content of the colloidal dispersions is determined gravimetrically after drying the sample for 2 hours at 110° C. in a ventilated oven.

Particle size measurement: The particle size of the original and the UV-exposed colloidal dispersions is determined by dynamic light scattering (DLS) using a Delsa Nano-c DLS instrument from Beckman-Coulter. A small quantity of the aqueous dispersion is diluted in the range 0.05 to 1 wt % with distilled deionized water (Milli-Q, 18MΩ). The auto-correlation function (ACF) of the scattered light intensity is recorded at an angle of 165°. The translational diffusion coefficient is next obtained from the decay rate of the ACF of the scattered electrical field according to the cumulants analysis. The z-average particle size $d_{DLS}$ is calculated from Stokes-Einstein relationship.

Swelling test: The swelling test consists in the comparison of the particle size of the (CPP) in dispersion in the (ACD) and in the presence of acetone. The particle size of the (CPP) in the (ACD) is determined as detailed supra. The particle size of the (CPP) in the presence of acetone is determined as follows. A sample of the (ACD) is diluted in acetone in the range 0.05 to 1 wt %. Acetone is a good solvent for most of the dispersed resins prior to photopolymerization. Particles which are not polymerized dissolve in acetone and virtually no light scattering is detected. On the contrary, (CPP) are non-soluble and give a light scattering signal. Hence, the light scattering signal, is used to follow the progress of the polymerization. The average scattered light is monitored in a fixed scattering volume for a defined polymer content using the DLS instrument in a static operation mode (cf particle size measurement). A comparison of the particle size in the (ACD) and in the presence of acetone provides indications about the swelling capacity and the degree of crosslinking of the particles.

Glass transition temperature (Tg) measurement: About 40 mg of the aqueous dispersion was put in a standard aluminum crucible prior to DSC analysis. The dispersion samples are dried during 1 hour at 50° C. followed by at least 48 hours at ambient temperature under reduced pressure. The thermograms are next recorded at a heating rate of 10° C./min using a Mettler DSC 823e instrument after suitable calibration with indium. The DSC cell is purged with nitrogen at a flow rate of 50 mL/min. After a first heating run to 90° C. for sample equilibration, a second heating run is conducted to determine the glass transition temperature of the material. The temperature at the inflection point of the glass transition is returned as the $T_g$ value.

EXAMPLE 1

An acrylated self-water dispersible polyurethane UA1 (compound (SW1)) was dispersed in water resulting in an aqueous colloidal dispersion with a dry content of 35.9 wt % and an average particle size of 54 nm (commercialized by Cytec as Ucecoat® 7655). 98.5 wt % of this dispersion was mixed with 1.5 wt % of a liquid photoinitiator (PI) (Irgacure 500: 1:1 mixture of 1-hydroxy cyclohexyl phenyl ketone and benzophenone) to form a dispersion (ACD) according to the present invention. Subsequent photopolymerizations were conducted at three dry contents of the dispersion (ACD), i.e., 9.0, 20.0 and 35.9 wt % obtained by addition of the required amount of water.

The dispersions (ACD) were exposed to UV-light following method (i) to form the colloidal dispersions of polymerized particles (DCPP). Table 1 reports the exposure time, the evolution of the $T_g$ and average size of the particles upon photoinduced polymerization.

The visual appearance of the dispersions during photoinduced polymerization is typically milky white due to intense light scattering.

TABLE 1

| Dry content (wt %) | UV-exposure time (min) | $T_g$ (° C.) | $d_{DLS}$ (nm) |
|---|---|---|---|
| 20 | 0 | 0 | 54 |
| 9 | 5 | 55 | |
|  | 10 | 58 | |
|  | 15 | 84 | 55 |
| 20 | 5 | | |
|  | 10 | 48 | |
|  | 15 | 56 | 60 |
| 35.9 | 5 | −5 | |
|  | 10 | 2 | 69 |
|  | 15 | 18 | 78 |

The results in Table 1 clearly show that the particles of the dispersions (ACD) preserve their colloidal nature after exposure to UV-light. The marked increase in $T_g$ demonstrates that the particles polymerize and transform from viscous to solid-like. It is also shown that the average $T_g$ can be adjusted by the irradiation conditions. The experiment further shows that the process is not limited to the photoinduced polymerization of translucent dispersions. It is also suitable for systems with a high degree of opacity.

COMPARATIVE EXAMPLE 1

A qualitative assessment of the degree of cross-linking of the particles can be obtained by coating a thin film (60 μm) of the dispersion (ACD) onto a corona-treated bioriented polypropylene (OPP) substrate using a bar coater followed by drying the film in an oven at 60° C. for 10 min.

Prior to UV-exposure, the dispersion (ACD) of Example 1 forms a uniform non-tacky film after evaporation of the water. When the dried film is subsequently UV-cured, a solvent resistant, uniformly cross-linked coating is obtained with a $T_g$ of about 60° C. Contrarily, a dry film of the (CDPP) prepared in Example 1 is not uniform. A brittle and pearly-looking material lacking any cohesion is obtained which shows that the CPP were cross-linked before film application.

EXAMPLE 2

An acrylated self-water dispersible polyurethane UA1 (compound (SW1)) was dispersed in water resulting in an aqueous colloidal dispersion with a dry content of 35.9 wt % and an average particle size of 54 nm (commercialized by Cytec as Ucecoat® 7655). 98.6 wt % of this dispersion was mixed with 1.4 wt % of a liquid photoinitiator (PI) (composed of EDB/BDK/BZP/TPO[1] in the ratio 30:30:20:20) to form a dispersion (ACD) according to the present invention. The dispersion (ACD) was next diluted with water to a dry content of 20 wt %.

After 30 min of UV-exposure following method (i), the final average $T_g$ value of the polymerized particles (CPP) was 55° C.

[1]EDB: Ethyl-4-dimethylamino benzoate
BDK: 2,2-Dimethoxy-1,2-diphenylethan-1-one
BZP: Benzophenone
TPO: 2,4,6-Trimethylbenzoyldiphenylphosphine oxide

EXAMPLE 3

An acrylated self-water dispersible polyurethane UA2 (compound (SW1)) was dispersed in water resulting in an aqueous colloidal dispersion with a dry content of 40.1 wt % and an average particle size of 121 nm (commercialized by Cytec as Ucecoat® 7719). 98.5 wt % of this dispersion was mixed with 1.5 wt % of a liquid photoinitiator (PI) (Irgacure 500: 1:1 mixture of 1-hydroxy cyclohexyl phenyl ketone and benzophenone) to form a dispersion (ACD) according to the present invention. Subsequent photopolymerizations were conducted at two dry contents of the dispersion (ACD), i.e., 10.0 and 20.0 wt % obtained by addition of the required amount of water.

The dispersions (ACD) were exposed to UV-light following method (i) to form the colloidal dispersions of polymerized particles (DCPP). Table 2 reports the exposure time, the evolution of the $T_g$ and average size of the particles upon photoinduced polymerization.

TABLE 2

| Dry content (wt %) | UV-exposure time (min) | $T_g$ (° C.) | $d_{DLS}$ (nm) |
|---|---|---|---|
| 20 | 0 | −29 | 121 |
| 10 | 5 | 1 | |
|  | 10 | 40 | |
|  | 15 | 50 | 146 |
| 20 | 5 | | |
|  | 10 | −22 | |
|  | 15 | 5 | 129 |

Table 2 shows that the particles of the dispersions (ACD) preserve their colloidal nature after exposure to UV-light. The increase in $T_g$ demonstrates that the particles polymerize and transform from viscous to solid-like upon UV-irradiation. The average $T_g$ can be tuned by the irradiation conditions.

COMPARATIVE EXAMPLE 2

A qualitative assessment of the degree of cross-linking of the particles can be obtained by coating a thin film (60 μm) of the ACD onto a corona-treated bioriented polypropylene (OPP) substrate using a bar coater followed by drying the film in an oven at 60° C. for 10 min.

Prior to UV-exposure, the dispersion (ACD) of Example 3 forms a tacky liquid-like film after water evaporation. When the dried film is subsequently UV-cured, a solvent resistant, uniformly cross-linked coating is obtained with a $T_g$ of about 40° C. However, a dry film of the CDPP prepared in Example 3 appears as a film-forming, but non-tacky, material after water evaporation. An acetone rub test reveals that the film has no cohesion and is easily removed from the OPP substrate which indicates that the CPP were cross-linked prior to film application.

EXAMPLES 4 AND 5

An acrylated self-water dispersible polyurethane UA2 (compound (SW1)) and trimethylolpropanetriacrylate (TMPTA) (compound (B)) were blended in a ratio 80:20 and codispersed in water resulting in an aqueous colloidal dispersion with a dry content of 40.0 wt % and an average particle size of 65 nm.

Two different approaches were followed to incorporate the (PI) (Irgacure 500) in order to obtain the dispersion (ACD). In Example 4, the (PI) was dissolved in the acrylated urethane oligomer UA2 prior to the dispersion step in water (pre-addition). In Example 5, the (PI) was added by simple mixing into the aqueous dispersion (post-addition). The amount of (PI) in examples 4 and 5 was 3.7 wt % with respect to the dry content of the dispersion and the dispersion (ACD) was diluted to a dry content of 20 wt %.

The dispersion (ACD) was exposed to UV-light following method (i) to form the colloidal dispersion of polymerized particles (DCPP).

Table 3 shows the average $T_g$ of the particles of the dispersions (ACD) as a function of the exposure time. In Example 4 where the (PI) is incorporated by pre-addition, the $T_g$ value raises by 60° C. in about 3 min reaching a plateau. In Example 5 where the (PI) is added by post-addition, the $T_g$ increase is delayed by a few minutes. Despite the kinetics difference, the final $T_g$ obtained in Examples 4 and 5 are close.

TABLE 3

| | $T_g$ (° C.) | |
|---|---|---|
| UV-exposure time (min) | Pre-addition | Post-addition |
| 0 | −29 | −29 |
| 1 | −24.4 | −28.7 |
| 2 | 12.1 | −24.7 |
| 3 | 26.9 | −22.2 |
| 4 | 33.3 | −11.1 |
| 5 | 32.6 | 26.1 |
| 7 | 30.9 | 21.2 |
| 10 | 33.2 | 25.6 |
| 15 | 29.6 | 28.3 |
| 20 | 34.2 | 35.7 |
| 30 | 35.6 | 38.3 |

This result shows clearly that when the PI is introduced differently in the dispersion, the polymerization kinetics of the particles is affected accordingly. When the PI is mixed with the resin before dispersion, the polymerization proceeds faster. Introduction of the PI in post-addition still results in the photo-initiated curing of the resin in the particles, which suggests that the PI penetrates into the particles, or at least partially.

EXAMPLES 6 AND 7

In Examples 6 and 7, Example 1 is reproduced, but UA1 is replaced by an acrylated self-water dispersible polyacrylic (AA1) (compound (SW1)) in Example 6 and by an acrylated self-water dispersible polyepoxy (EA1) (compound (SW1)) in Example 7. Table 4 reports the exposure time, the evolution of the $T_g$ and the average particle size upon photoinduced polymerization.

TABLE 4

| | Dry content (wt %) | UV-exposure time (min) | $T_g$ (° C.) | $d_{DLS}$ (nm) |
|---|---|---|---|---|
| AA1 | 20 | 0 | −7 | 104 |
| | | 15 | 22 | |
| | | 30 | 28 | 109 |
| EA1 | 20 | 0 | −13 | 381 |
| | | 30 | 41 | 361 |

EXAMPLE 8

A hydroxyl-terminated self-water dispersible polyurethane, UA3 (compound (SW2)), was blended with acrylated ethoxylated trimethylolpropane (TMPOETA) (compound (B)) in a ratio 66.6:33.3 and codispersed into water resulting in an aqueous colloidal dispersion with a dry content of 45.1 wt % and an average particle size of 97 nm. The dispersion (ACD) was next obtained by addition of the liquid photoinitiator Irgacure 500 (PI) in an amount of 4.4 wt % on dry content.

The dispersion (ACD) was exposed to UV-light following method (i) to form the colloidal dispersion of polymerized particles (DCPP).

After 7 min of UV-exposure, the average $T_g$ value of the particles jumped from −37 to 26° C. without altering the colloidal nature of the dispersion. After 30 min, the ultimate $T_g$ value was 32° C. and the final particle size was 109 nm, compared to 97 nm before polymerization. The resulting particles bear residual hydroxyl functions.

The particles obtained from Examples 1 to 8 do not swell in contact with acetone. Acetone is a good solvent of the starting resins UA1, UA2, UA3, AA1 and EA1 before photoinduced polymerization.

EXAMPLE 9

An acrylated self-water dispersible polyurethane UA4 (compound (SW1)) was dispersed in water resulting in an aqueous colloidal dispersion with a dry content of 35.0 wt % and an average particle size of 35 nm. UA4 is based on a long chain polyester, a carboxylic diol moiety, an aliphatic diisocyanate and hydroxyethyl acrylate.

The dispersion (ACD) was obtained by adding 4 wt % of Irgacure 500 with respect to the dry content of the dispersion. The dispersion (ACD) was diluted to a dry content of 20 wt % prior to photopolymerization.

The dispersion (ACD) was exposed to UV-light following method (ii) to form the colloidal dispersion of polymerized particles (DCPP).

Dilution of the (DCPP) in acetone shows that the (CPP) particles do not dissolve but, in contrast to the former examples, they swell from an initial size $d_{DLS}$ of 35 nm to about 70 nm corresponding to an eightfold increase in volume. Before photopolymerization, the $T_g$ value of the particles is about −30° C. After photopolymerization, two glass transitions are evidenced reflecting the soft segments of the polymer ($T_g$=−30° C.) and the hard domains formed after reaction of the acrylate double bonds ($T_g$=85° C.).

EXAMPLE 10

An acrylated self-water dispersible polyurethane UA2 (compound (SW1)) and Neozapon Blue 807 (blue dye commercialized by BASF, additive (C)) were blended in a ratio 98:2 and codispersed in water resulting in an aqueous colloidal dispersion with a dry content of 40.0 wt % and an average particle size of 68 nm. 1.5 wt % of Irgacure 500 (PI) was subsequently blended to 98.5 wt % of the previous dispersion to obtain the dispersion (ACD).

In order to produce a colloidal dispersion of polymerized particles (DCPP), the dispersion (ACD) was exposed to UV-light according to method (i). Experiments were performed at a dry content of 13.3 wt %.

The particles were separated from the aqueous phase by addition of a few drops of concentrated HCl to coagulate the colloids followed by centrifugation at 24000 rpm during 30 min. The supernatant was uncolored and nearly transparent showing that the dye was completely incorporated into the particles.

Table 5 reports the exposure time, the evolution of the $T_g$ and average size of the particles upon photoinduced polymerization. The results in Table 5 show that the particles preserve their colloidal nature after exposure to UV-light. Starting from a $T_g$=−30° C. for the particles of the non-exposed dispersion (ACD), the $T_g$ raises significantly upon UV-exposure showing that the particles gradually transform from viscous to solid-like upon UV-irradiation. The average $T_g$ can be tuned by the irradiation conditions.

TABLE 5

| UV-exposure time (s) | $T_g$ (° C.) | $d_{DLS}$ (nm) |
|---|---|---|
| 0 | −30 | 68 |
| 30 | 21 | 101 |
| 45 | 30 | 101 |
| 75 | 33 | 101 |
| 135 | 46 | 101 |

EXAMPLE 11

An acrylated self-water dispersible polyurethane UA2 (compound (SW1)), TMPTA (compound (B)) and Irgarol 1051 (biocide commercialized by BASF, additive (C)) were blended in a ratio 78:19.5:2.5 and codispersed in water resulting in an aqueous colloidal dispersion with a dry content of 40.4 wt % and an average particle size of 88 nm. 1.6 wt % of Irgacure 500 (PI) was subsequently blended to 98.4 wt % of the previous dispersion to obtain the dispersion (ACD).

In order to produce a colloidal dispersion of polymerized particles (DCPP), the dispersion (ACD) was exposed to UV-light according to method (i). Experiments were performed at a dry content of 20 wt %.

After 30 min, the average $T_g$ value of the dispersed particles raised from −25 to 36° C.

EXAMPLE 12

Example 11 is reproduced, but using 8-hydroxyquinoline (corrosion inhibitor for aluminum, additive (C)) instead of the biocide. UA2 (compound (SW1)), TMPTA (compound (B)) and 8-hydroxyquinoline were blended in a ratio 78.8: 19.7:1.5 and codispersed in water resulting in an aqueous colloidal dispersion with a dry content of 39.6 wt % and an average particle size of 70 nm. 1.6 wt % of Irgacure 500 (PI) was subsequently blended to 98.4 wt % of the previous dispersion to obtain the dispersion (ACD).

In order to produce a colloidal dispersion of polymerized particles (DCPP), the dispersion (ACD) was exposed to UV-light according to method (i). Experiments were performed at a dry content of 20 wt %.

The $T_g$ of the particles increased from −25 to 4° C. over the course of a 30 min UV-exposure.

EXAMPLE 13

An acrylated self-water dispersible polyurethane UA2 (compound (SW1)) and hexadecane (phase change material, additive (C)) were blended in a ratio 80:20 and codispersed in water resulting in an aqueous colloidal dispersion with a dry content of 35.3 wt % and an average particle size of 161 nm. 1.5 wt % of Irgacure 500 (PI) was subsequently mixed to 98.5 wt % of the previous dispersion to obtain the dispersion (ACD).

The dispersion (ACD) was diluted to a dry content of 20 wt % prior to photopolymerization.

The dispersion (ACD) was exposed to UV-light following method (ii) to form the colloidal dispersion of polymerized particles (DCPP).

Dilution of the DCPP in acetone shows that the particles (CPP) do not dissolve anymore after a UV-exposure of 1 min due to the cross-linking of UA2. As hexadecane is not miscible with UA2, it is believed that encapsulation of the phase-change material took place in this case.

EXAMPLE 14

An acrylated self-water dispersible polyurethane UA1 (compound (SW1)) was dispersed in water resulting in an aqueous colloidal dispersion with a dry content of 35.9 wt % and an average particle size of 51 nm (commercialized by Cytec as Ucecoat® 7655). 98.5 wt % of this dispersion was mixed with 1.5 wt % of a liquid photoinitiator (PI) (Irgacure 500: 1:1 mixture of 1-hydroxy cyclohexyl phenyl ketone and benzophenone) to form a dispersion (ACD) according to the present invention. The dispersion (ACD) was diluted to a dry content of 20 wt % prior to photopolymerization.

The dispersion (ACD) was exposed to UV-light following method (iii) to form the colloidal dispersion of polymerized particles (DCPP). The exposure time was varied by changing the flow rate of the aqueous dispersion in the continuous flow reactor.

After photoinduced polymerization, the (CPP) particles could not be dissolved anymore upon dilution of the (DCPP) in acetone. However, significant swelling could be established from a comparison of the particle size $d_{DLS}$ in water and acetone at different flow rates (Table 6). By increasing the length of the reactor to 2.3 m, swelling was suppressed.

TABLE 6

| Flow rate (L/h) | $d_{DLS}$ (nm) Water | $d_{DLS}$ (nm) Acetone |
|---|---|---|
| 0.71 | 51 | 73 |
| 1.18 | 52 | 92 |
| 1.78 | 52 | 106 |

EXAMPLE 15

An acrylated self-water dispersible polyurethane UA2 (compound (SW1)) and Reofos®BAPP (Chemtura, flame retardant additive (C)) were blended in a ratio 70:30 and co-dispersed in water resulting in an aqueous colloidal dispersion with a dry content of 40.0 wt % and an average particle size of 129 nm. 1.0 wt % of Irgacure 500 (PI) was subsequently mixed to 99.0 wt % of the previous dispersion to obtain the dispersion (ACD). The dispersion (ACD) was not diluted prior to photopolymerization. The dispersion (ACD) was exposed to UV-light following method (iii) to form the colloidal dispersion of polymerized particles (DCPP). The flow rate was 0.4 L/h. Dilution of the DCPP in acetone shows that the particles (CPP) do not dissolve anymore after a UV-exposure due to the cross-linking of UA2. The crosslinked particles act as sub-micron sized containers for the flame retardant agent.

The invention claimed is:

1. A process for the preparation of colloidal polymerized particles (CPP) in the absence of emulsifier or other dispersing aid comprising the steps of:
 (a) forming a photopolymerizable aqueous colloidal dispersion (ACD) comprising:
  (i) at least one self-water dispersible compound (SW),
  (ii) at least one photoinitiator (PI), and
  (iii) optionally at least one photopolymerizable compound (B),
 (b) polymerizing the photopolymerizable aqueous colloidal dispersion (ACD) by photoinduced polymerization to form a dispersion of colloidal polymerized particles (DCPP), and
 (c) optionally isolating the particles obtained at step (b) from the aqueous phase to obtain isolated colloidal polymerized particles (ICPP),
 wherein the dispersion (ACD) comprises:
  (a) from 35 to 99.5 wt % of water calculated based on the total weight of the dispersion (ACD), and
  (b) from 0.5 to 65 wt % of dry content calculated based on the total weight of the dispersion (ACD),
 wherein the dry content comprises:
  (i) from 26 to 99.9 wt % of compound (SW),
  (ii) from 0.1 to 14 wt % of photoinitiator (PI), and
  (iii) from 0 to 60 wt % of compound (B),
  wherein the amounts of compound (SW), photoinitiator (PI) and compound (B) are calculated based on the dry content of the dispersion (ACD), and
 wherein
  the self-water dispersible compound (SW) comprises at least one photopolymerizable self-water dispersible compound (SW1),
  the self-water dispersible compound (SW) comprises at least one non photopolymerizable self-water dispersible compound (SW2) and at least one photopolymerizable compound (B) is present, or
  the self-water dispersible compound (SW) comprises at least one photopolymerizable self-water dispersible compound (SW1) and at least one non photopolymerizable self-water dispersible compound (SW2).

2. The process according to claim 1, wherein compound (SW1) is selected from the group consisting of (meth)acrylated self-water dispersible polyurethanes, (meth)acrylated self-water dispersible poly(meth)acrylates, (meth)acrylated self-water dispersible polyesters, (meth)acrylated self-water dispersible polyethers, (meth)acrylated self-water dispersible polycarbonates, (meth)acrylated self-water dispersible polyepoxys and mixtures thereof.

3. The process according to claim 1, wherein compound (SW2) is selected from the group consisting of self-water dispersible polyurethanes, self-water dispersible poly(meth)acrylics, self-water dispersible polyepoxys, self-water dispersible polyesters, self-water dispersible alkyd polymers, self-water dispersible phenolic resins and mixtures thereof.

4. The process according to claim 1, wherein compound (B) is selected from the group consisting of (meth)acrylated compounds.

5. The process according to claim 1, wherein compound (SW) and/or compound (B) are compounds bearing at least one functional group selected from the group consisting of epoxide, hydroxyl, amine, isocyanate, and carboxylic acid.

6. The according to claim 1, wherein the dispersion (ACD) further comprises at least one additive (C) selected from solid and/or liquid non reactive additives that are not soluble in water.

7. The according to claim 6, wherein additive (C) is selected from the group consisting of dyes, organic and/or inorganic corrosion inhibitors, catalysts, UV-absorbers, crosslinkers, anti-fouling agents, biocides, hydrophobicity modifiers, antiscaling agents, freezing depressors, phase change compounds and mixtures thereof.

8. The process according to claim 1, wherein the dispersion (ACD) further comprises at least one non self water dispersible compound (D).

9. Dispersion of colloidal polymerized particles (DCPP) obtained by a process according to claim 1.

10. A method comprising adding the dispersion of colloidal polymerized particles (DCPP) according to claim 9 as fillers to compositions suitable for the preparation of composite materials.

11. Isolated colloidal polymerized particles (ICPP) obtained by a process according to claim 1.

12. A method comprising adding isolated colloidal polymerized particles (ICPP) according to claim 11 as fillers to compositions suitable for the preparation of composite materials.

* * * * *